United States Patent [19]

Mills

[11] 3,717,358
[45] Feb. 20, 1973

[54] SHOPPING CART CONSTRUCTION
[75] Inventor: Frank Jr. Mills, Olympia Fields, Ill.
[73] Assignee: Tote-Cart Company
[22] Filed: Aug. 26, 1970
[21] Appl. No.: 67,075

[52] U.S. Cl. ........................................ 280/33.99 R
[51] Int. Cl. ............................................ B62b 11/00
[58] Field of Search ................... 280/33.99; 186/1 AC

[56] References Cited

UNITED STATES PATENTS

| 3,501,164 | 3/1970 | Peterson | 280/33.99 C |
| 3,329,441 | 7/1967 | Mills, Jr. | 280/33.99 B |
| 2,812,187 | 11/1957 | Nicholl et al. | 280/33.99 F |
| 3,184,248 | 5/1965 | Hummer | 280/33.99 B |
| 3,026,122 | 3/1962 | Young | 280/33.99 H |

FOREIGN PATENTS OR APPLICATIONS 995,855    6/1965    Great Britain ................ 280/33.99 F Primary Examiner—Leo Friaglia
Assistant Examiner—Milton L. Smith
Attorney—Hofgren, Wegner, Allen, Stellman & McCord

[57] ABSTRACT

A shopping cart having an improved internal handle support avoiding catching of the support on another such basket as the result of a nesting operation. The cart is further provided with stop means for limiting the swing of the rear gate to avoid damage to the gate as by overswinging thereof into engagement with the handle. The stop means herein is provided on the handle support.

11 Claims, 3 Drawing Figures

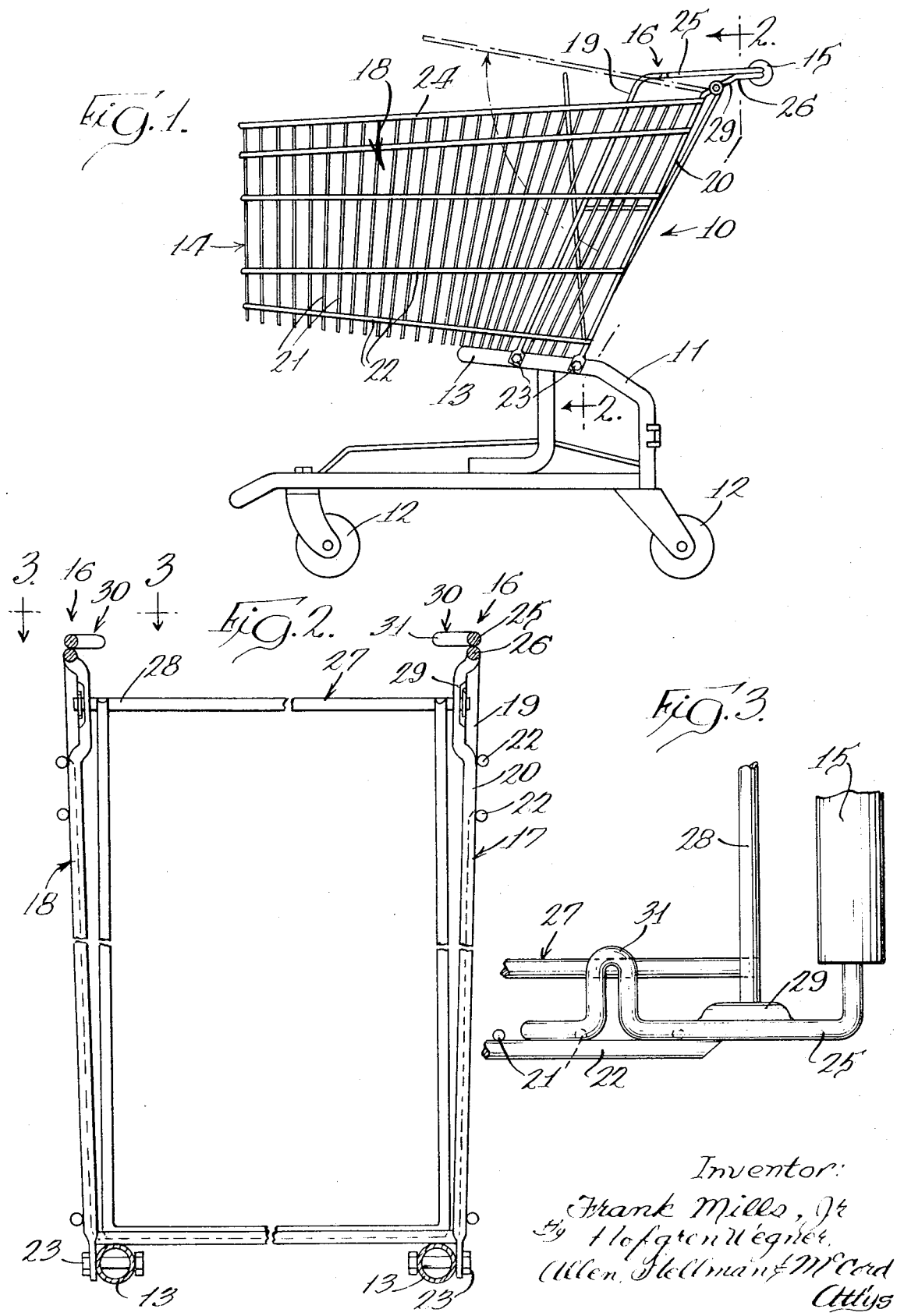

SHOPPING CART CONSTRUCTION

BACKGROUND OF THE INVENTION

1. Field of the Invention

This invention relates to carts and in particular to wire basket type shopping carts.

2. Description of the Prior Art

In one form of conventional shopping cart, a wire basket is mounted on a wheeled frame. The rear of the basket is normally closed by a gate which is swingably mounted to move from a depending basket closing position to a raised position above the basket whereby a second such cart may be rearwardly nested into the cart under the raised gate. The cart is conventionally manipulated by the user by means of a handle at the upper rear of the basket. The handle is carried on one or more wire supports extending along the outside of the basket at the rear end of the opposite sides of the basket. It has been found that with such construction there is a tendency for hang-up of nested baskets, making difficult their separation from the nested arrangement. Further in such known basket constructions, damage is often inflicted on the gate by the swinging thereof beyond the raised position into engagement with the handle.

SUMMARY OF THE INVENTION

The present invention comprehends an improved shopping cart construction eliminating the disadvantages of the known shopping carts as discussed above in a novel and simple manner. More specifically, in applicant's cart construction, an upright handle support is provided at the rear of the basket inwardly of the outer horizontal wires of the basket, thereby to effectively preclude abutment of the upright support with a basket into which the cart is nested. The upright support may comprise a pair of wires at each side of the basket at the rear thereof. The wires of each pair are spaced apart fore and aft of the basket and the rear upright wires may comprise the rearmost upright wire of the basket.

Stop means are provided for limiting the swing of the gate, to prevent engagement thereof with the handle carried on the above discussed upright support. The stop means may be provided on one or more of the upright support wires and in the illustrated embodiment, comprise a formed portion of the wire projecting into the path of swinging of the gate. The upward swinging of the gate may be limited by the stop means to a maximum position slightly above the upper level of the basket, thereby effectively precluding damage to the gate by such overswinging thereof into engagement with the handle. A pair of such stop projections may be provided at opposite sides of the basket by provision integrally with the forward upright wires disposed at such opposite sides.

BRIEF DESCRIPTION OF THE DRAWING

Other features and advantages of the invention will be apparent from the following description taken in connection with the accompanying drawing wherein:

FIG. 1 is a side elevation of a shopping cart embodying the invention;

FIG. 2 is a fragmentary vertical section taken substantially along the line 2—2 of FIG. 1 showing the arrangement of the handle upright supports looking from the rear of the basket; and FIG. 3 is a fragmentary top plan view of the basket construction with the gate in an upper position as shown in broken lines in FIG. 1.

DESCRIPTION OF THE PREFERRED EMBODIMENT

In the exemplary embodiment of the invention as disclosed in the drawing, a shopping cart generally designated 10 is shown to comprise a base frame 11 provided with suitable wheels 12 for rolling movement of the cart as desired. The frame includes an upper, generally horizontal portion 13 carrying a wire basket generally designated 14 in a cantilevered fashion. A handle 15 is provided for manipulating the cart.

Handle 15 is connected to the cart by means of a pair of uprights generally designated 16 disposed at the opposite sides 17 and 18 of the basket at the rear thereof. Each upright, as shown in FIG. 1, includes a forward wire 19 and a rearward wire 20. The wire basket includes a plurality of vertical wires 21 and a plurality of horizontal wires 22.

As best seen in FIG. 2, the upright wires 19 and 20 are disposed inwardly of the horizontal wires 22. More specifically, upright wires 19 and 20 are disposed substantially within the portion of the basket sides defined by the inner vertical wires 21 whereby the upright wires are effectively recessed within the side walls of the basket, thereby minimizing interference by the upright wires with portions of a similar such basket nested therewith or with which the basket is nested.

As shown, the wires 19 and 20 may be secured to the base frame portion 13 by suitable means, such as bolts 23. The wires extend to above the upper level 24 of the basket. Wire 19 includes a rearwardly turned upper portion 25 and wire 20 includes a rearwardly turned portion 26 to which portions the handle 15 is connected as seen in FIG. 1.

The rear of the basket is normally closed by a gate generally designated 27 having an upper pivot wire 28 received in suitable pivots 29 in each of the opposite rear wires 20. The gate is thereby swingably mounted for selective disposition in the basket closing position shown in full lines in FIG. 1, and a raised, nesting-permitting position shown in broken lines therein. The swinging movement of the gate from the basket closing position is limited herein by stop means generally designated 30 so that the upward swinging of the gate is limited to a position slightly above upper level 24 of the basket, thereby effectively precluding damage to the gate as has occurred in the baskets of the art wherein the gate could be swung fully into engagement with the handle. In the illustrated embodiment, stop means 30 comprise formed portions of the upright wire portion 25. Thus, as shown in FIG. 3, the stop means comprise inturned loops 31 projecting into the path of movement of the gate 27. As shown in FIG. 2, the stop means loops project inwardly at each of the opposite sides 17 and 18 of the basket to provide a double stop arrangement effectively positively limiting the swing of the basket while effectively precluding twisting of the gate on the pivot wire 28. As stop means 30 permit the gate to swing to a position above the upper level 24 of the basket, free nesting of a plurality of the baskets is permitted while yet the desired control of the swinging to avoid damage to the gate is obtained. As the upright wire 19 is disposed inwardly of the horizontal wires, minimum extension of the stop means loops 31 to intersect the path of movement of the gate is required, thereby providing increased strength in the stop means for improved trouble-free life of the structure.

The improved cart construction 10, as discussed above, is extremely simple and economical of manufacture, while yet providing the highly desirable features eliminating the disadvantages of the discussed prior art carts.

The foregoing disclosure of specific embodiments is illustrative of the broad inventive concepts comprehended by the invention.

I claim:

1. In a shopping cart having a wheeled base and a wire basket fixedly carried on the wheeled base and including side portions provided with a plurality of outer horizontal wires and inner vertical wires defining outermost portions and a cart-manipulating handle, means for mounting said handle to the basket comprising: a pair of uprights disposed fully inwardly of said horizontal wires and having outermost portions coplanar with the outermost portions of said vertical wires, each upright having an upper portion extending transversely fully between the planes of said outermost portion of said vertical wires; and means for securing said handle to said upper portion of both said uprights, the inward disposition of said uprights effectively precluding undesirable abutment of portions of a second cart with said uprights as a result of nesting of one such cart with a similar such cart.

2. The shopping cart means of claim 1 wherein said uprights comprise wires extending the height of the basket inwardly of said horizontal wires.

3. The shopping cart means of claim 1 wherein said uprights extend substantially within the wall portion of the basket side portions defined by the said vertical inner basket wires.

4. The shopping cart means of claim 1 wherein each of said pair of uprights comprises a pair of wires spaced apart fore-and-aft of the basket.

5. The shopping cart means of claim 4 wherein one of said pair of wires of each upright is disposed at the rear end of the horizontal wires.

6. The shopping cart means of claim 4 further including a gate, means for swingably mounting the gate to the basket to swing from a first, normal position closing the rear of the basket outwardly to a second, clearance position above the upper level of the basket to permit nesting of a second such cart therewith as a result of the swinging of the gate to said clearance position, and means on at least one said upright for limiting the outward swinging of the gate.

7. In a shopping cart having a wire basket defining a top plane and including a gate swingably mounted to the cart for selectively closing the rear of the basket, and a cart-manipulating handle including a wire support forming a portion of said wire basket, the improvement comprising: means for connecting the handle to the cart at the rear of the basket; and fixed means comprising a short turned portion of one of the wires defining said wire basket adjacent the top plane of the basket for preventing at all times the swinging of the gate from a downwardly extending basket-closing arrangement upwardly through the basket beyond a preselected position wherein the gate is disposed adjacent the top plane of the basket.

8. The shopping cart means of claim 7 wherein said last named means is provided on said handle connecting means.

9. The shopping cart means of claim 7 wherein said swinging-preventing means is arranged to preclude swinging of the gate sufficiently to flip over into engagement with said handle.

10. The shopping cart means of claim 7 wherein said limiting means comprises a pair of stops at opposite sides of the basket disposed in the path of movement of said gate from said basket-closing position.

11. The shopping cart means of claim 7 wherein said limiting means is arranged to limit the swinging of the gate to slightly above the upper level of the basket.

* * * * *